US006785564B1

(12) United States Patent
Quigley et al.

(10) Patent No.: US 6,785,564 B1
(45) Date of Patent: Aug. 31, 2004

(54) METHOD AND APPARATUS FOR LATENCY REDUCTION IN LOW POWER TWO WAY COMMUNICATIONS EQUIPMENT APPLICATIONS IN HYBRID FIBER COAX PLANTS

(75) Inventors: Thomas J. Quigley, Duluth, GA (US); Ted Rabenko, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 630 days.

(21) Appl. No.: 09/654,109

(22) Filed: Aug. 31, 2000

Related U.S. Application Data

(60) Provisional application No. 60/151,686, filed on Aug. 31, 1999.

(51) Int. Cl.[7] .................................................. H04B 1/38
(52) U.S. Cl. ........................ 455/574; 455/69; 455/3.03; 370/311
(58) Field of Search ........................ 455/69, 564, 3.03, 455/574; 370/311; 375/219, 222

(56) References Cited

U.S. PATENT DOCUMENTS

| | | | | |
|---|---|---|---|---|
| 5,805,597 A | * | 9/1998 | Edem ......................... | 370/445 |
| 5,881,102 A | * | 3/1999 | Samson ...................... | 375/222 |
| 6,215,764 B1 | * | 4/2001 | Wey et al. .................. | 370/216 |
| 6,434,119 B1 | * | 8/2002 | Wiese et al. ................ | 370/252 |
| 6,445,730 B1 | * | 9/2002 | Greszczuk et al. ......... | 375/219 |
| 6,542,500 B1 | * | 4/2003 | Gerszberg et al. .......... | 370/354 |

FOREIGN PATENT DOCUMENTS

| | | |
|---|---|---|
| EP | A-0 243 899 | 11/1987 |
| EP | A-0 433 166 | 6/1991 |
| WO | WO 9613106 | 5/1996 |
| WO | WO 99/33229 | 7/1999 |

OTHER PUBLICATIONS

Schuck, J., et al. KISS–16V1: A 16 Bit Signal Processor, pp. 1905–1908.
U.S. patent application Ser. No. 09/652,718, Denney et al., filed Aug. 31, 2000.
Copy of Written Opinion for International Application No. PCT/US00/23927, mailed Dec. 7, 2001.

* cited by examiner

*Primary Examiner*—Nick Corsaro
(74) *Attorney, Agent, or Firm*—Sterne Kessler Goldstein & Fox P.L.L.C.

(57) ABSTRACT

A two way communication system is adapted to reduce latency while the communications system is operating in a low power mode. The two way communication system includes a local host having a first primary communication channel and a secondary out of band transmitter; and customer premise equipment having a primary communication channel for communicating with the first primary communication channel of the local host and a secondary low power out of band receiver that receives out of band control signals from the out of band transmitter during low power operation of the customer premise equipment.

16 Claims, 10 Drawing Sheets

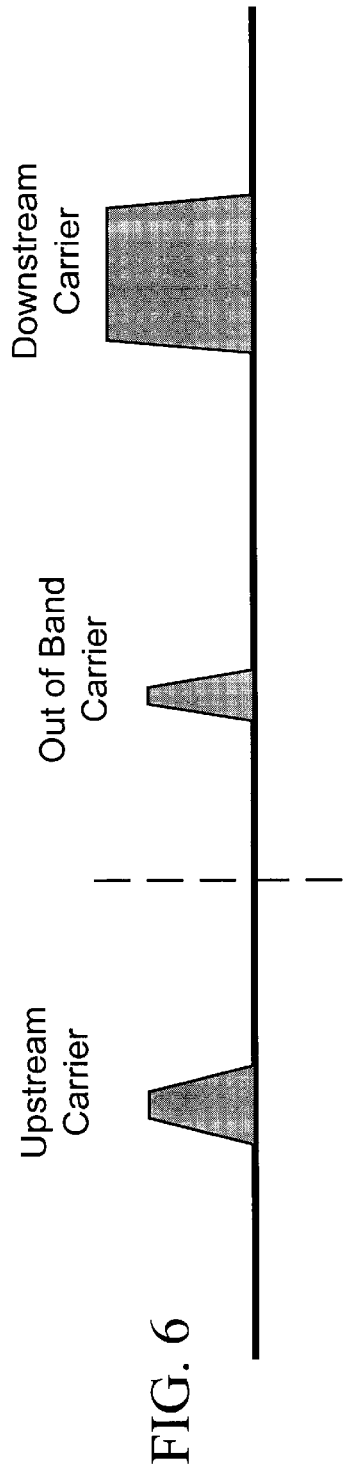
FIG. 6
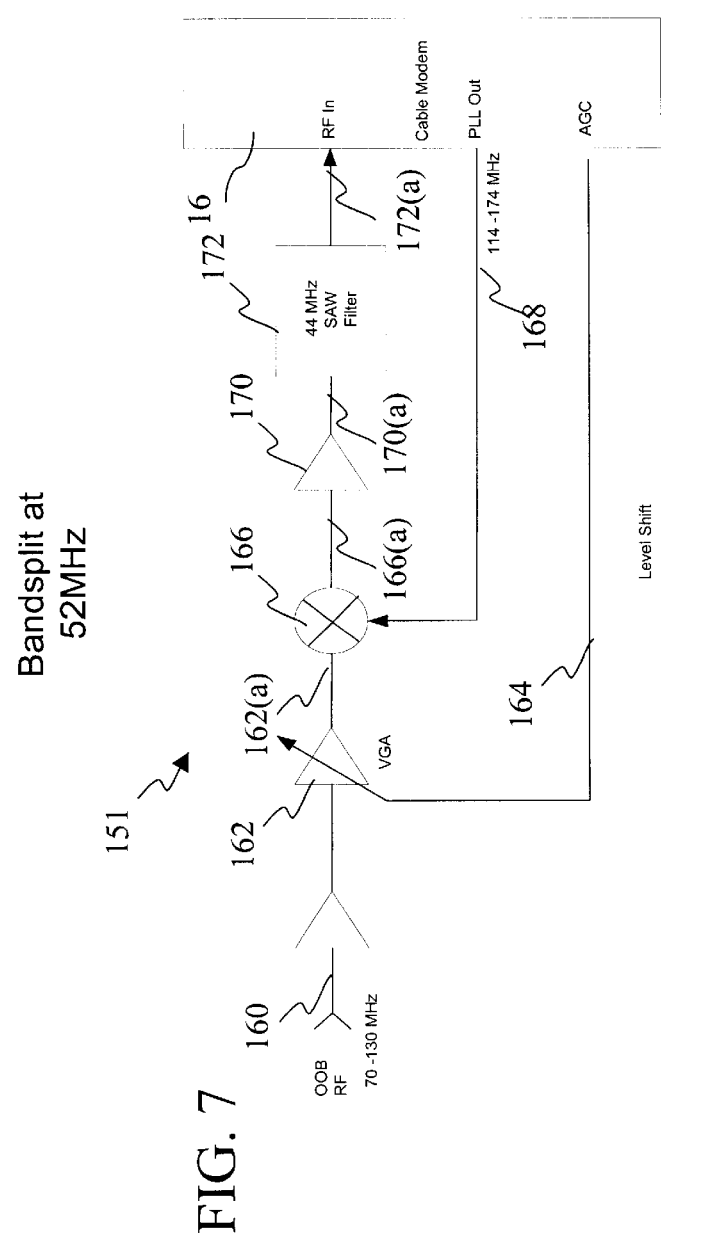
FIG. 7
FIG. 8

METHOD AND APPARATUS FOR LATENCY REDUCTION IN LOW POWER TWO WAY COMMUNICATIONS EQUIPMENT APPLICATIONS IN HYBRID FIBER COAX PLANTS

CROSS-REFERENCE TO RELATED APPLICATION(S)

This application claims priority to U.S. Provisional Patent Application No. 60/151,686 filed Aug. 31, 1999, the contents of which is hereby incorporated by reference.

FIELD OF THE INVENTION

The present invention relates generally to telecommunications systems, and more particularly, to a system for reducing latency in low power equipment applications in hybrid fiber coax (HFC) plants.

BACKGROUND

The Internet has become a pervasive medium that allows worldwide access to multi-media content including audio, video, graphics and text, that typically requires a large bandwidth for downloading and viewing. Most Internet Service Providers ("ISPs") allow customers to connect to the Internet via a serial telephone line from a Public Switched Telephone Network ("PSTN") Conventional PSTN connections typically provide data rates ranging from 14,400 bps to 56,000 bps. These data rates are typically much slower than the data rates available on a coaxial cable or HFC cable system in a cable television network.

A Cable Television Network, also known as a Community Access Television (CATV) network, typically consists of a traditional coaxial cable tree and branch or HFC network. A headend controller manages downstream and upstream bandwidth resources that have been assigned to a cable modem service. The headend controller may simultaneously provide service to and control over one or more downstream channels and one or more upstream channels. A cable modem is typically located at the home of a CATV network subscriber. Cable modems receive information and instructions via signals received on the downstream channel by the headend controller. A cable modem transmits information and replies via signals on an upstream channel to the headend controller.

Communication between the headend and customer premise equipment (CPE) such as a cable modem, may be accomplished via RF modulation of data in the forward path(headend to CPE) that all CPE may demodulate and process. The headend may also communicate control messages and timing references to the CPE to enable the CPEs to transmit bursts of data in the return path (CPE to headend). The bursts are synchronized so that the headend may demodulate and properly process the received data.

Advantageously, transmission of signals by coaxial cable introduces little distortion at high data transmission rates. However, the coaxial cable may significantly attenuate the transmitted signal. Conventionally, amplifiers are spaced along the coaxial cable throughout a HFC network to provide necessary signal enhancement. Other active devices such as for example fiber nodes may also be present in an HFC network. Failure of the primary power source in such a system removes power from these active devices, effectively shutting down the HFC network. Such a network failure may be unacceptable for voice over cable applications that require strict system availability. In addition, the government also requires system availability in certain locations even if there is a loss of the primary commercial power source.

Therefore, standby power system are typically utilized to provide auxiliary power to active network components as well as to certain customer premise equipment in the event of failure of the primary source of power. Standby systems typically include a storage battery, that is maintained at full charge by current drawn from the coaxial cable. Following failure of the primary source, the standby system delivers power immediately to avoid disruption of service over the CATV network.

However, standby power systems are extremely expensive. Each standby power unit typically includes a rectifier, battery, regulator, inverter and, in many cases, the logic circuitry for turning the standby unit on and off. Secondly, because of the circuit complexity, maintenance and replacement costs are high. Thirdly, also because of the circuit complexity, reliability is not high. Therefore, to reduce the cost of maintaining a standby power system, service providers attempt to minimize the overall power load of equipment coupled to a HFC network.

The RF circuitry and digital logic required to support and maintain bi-directional communication between customer premise equipment and the cable headend over a HFC network consumes significant amounts of power. However, the DOCSIS specification does not provide the ability to interface with equipment having power management systems. In fact, DOCSIS prohibits device disconnection, specifically requiring DOCSIS network equipment be available at all times to respond to maintenance requests. However, in lifeline powering situations, equipment that must remain available during a power outage strain the ability of the HFC plant to supply power to all network components. Therefore, it would be advantageous to reduce the power of DOCSIS compatible customer premise equipment to ensure efficient operation of the HFC plant during lifeline or power out situations.

Conventional power management techniques typically realize power savings by disabling the tuning and demodulation circuits. When returning to the full power active state, the equipment whose demodulation circuits have been disabled must re-synchronize to the CMTS to resume accurate bi-directional communications over the HFC network. Therefore, applications that have strict latency requirements may not be supported by such conventional systems. An example of an application that is adversely affected by this power management technique is voice telephony. In addition, DOCSIS specifically prohibits the incorporation of network equipment that is not available at all times to respond to maintenance requests. Therefore, it would be advantageous to provide a power management system that reduces the power of bi-directional communications equipment without introducing significant latency.

SUMMARY OF THE INVENTION

In one aspect of the present invention a method for reducing latency in a communications system includes monitoring the activity level of a first transceiver, disabling a high power channel as a function of the activity level and activating a low power channel to facilitate communication of control signals from a second transceiver.

In another aspect of the present invention a method for mitigating latency in a communications system while the communications system is operating at reduced power includes disabling one or more primary communication channels of a first transceiver, disabling one or more connected peripheral devices while the primary communications channel is disabled, receiving messages from a second transceiver, transmitted on a secondary communication channel, wherein the messages are used to restore normal operating conditions when an unscheduled, high priority activity arrives; and wherein the bandwidth of each secondary channel is less than the bandwidth of each primary channel.

In another aspect of the present invention a two communication system having a power management system that reduces the power of bi-directional communications equipment without introducing significant latency includes a local host having a primary broadband communication channel and a secondary narrowband transmitter and customer premise equipment having a primary communication channel for communicating with the primary communication channel of the local host and a secondary low power out of band receiver that receives out of band control signals from the out of band transmitter during low power operation of the customer premise equipment.

In a further aspect of the present a method for mitigating latency in a communications system while the communications system is operating at reduced power includes disabling a high power channel of a first transceiver, activating a low power channel of the first transceiver to enable reception of control signals from a second transceiver and activating the high power channel of the first transceiver upon lapse of a predetermined time.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

These and other features, aspects, and advantages of the present invention will become better understood with regard to the following description, appended claims, and accompanying drawings where:

FIG. 6 is a graphical illustration of the frequency spectrum of a DOSCIS compatible network;

FIG. 7 is a simplified block diagram of an out of band receiver front end that receives a digitally modulated signal in the frequency range of 70–130 MHz and converts it to an IF signal centered at 44 MHz in accordance with an exemplary embodiment of the present invention;

FIG. 8 is an exemplary frame structure of the out of band channel in accordance with an exemplary embodiment of the present invention;

DETAILED DESCRIPTION OF THE INVENTION

An exemplary embodiment of the present invention provides a power management system that reduces the power of DOCSIS compliant equipment without introducing significant latency. In order to appreciate the advantages of the present invention, it will be beneficial to describe the invention in the context of an exemplary bi-directional communication network, such as a HFC network.

Figure 1:
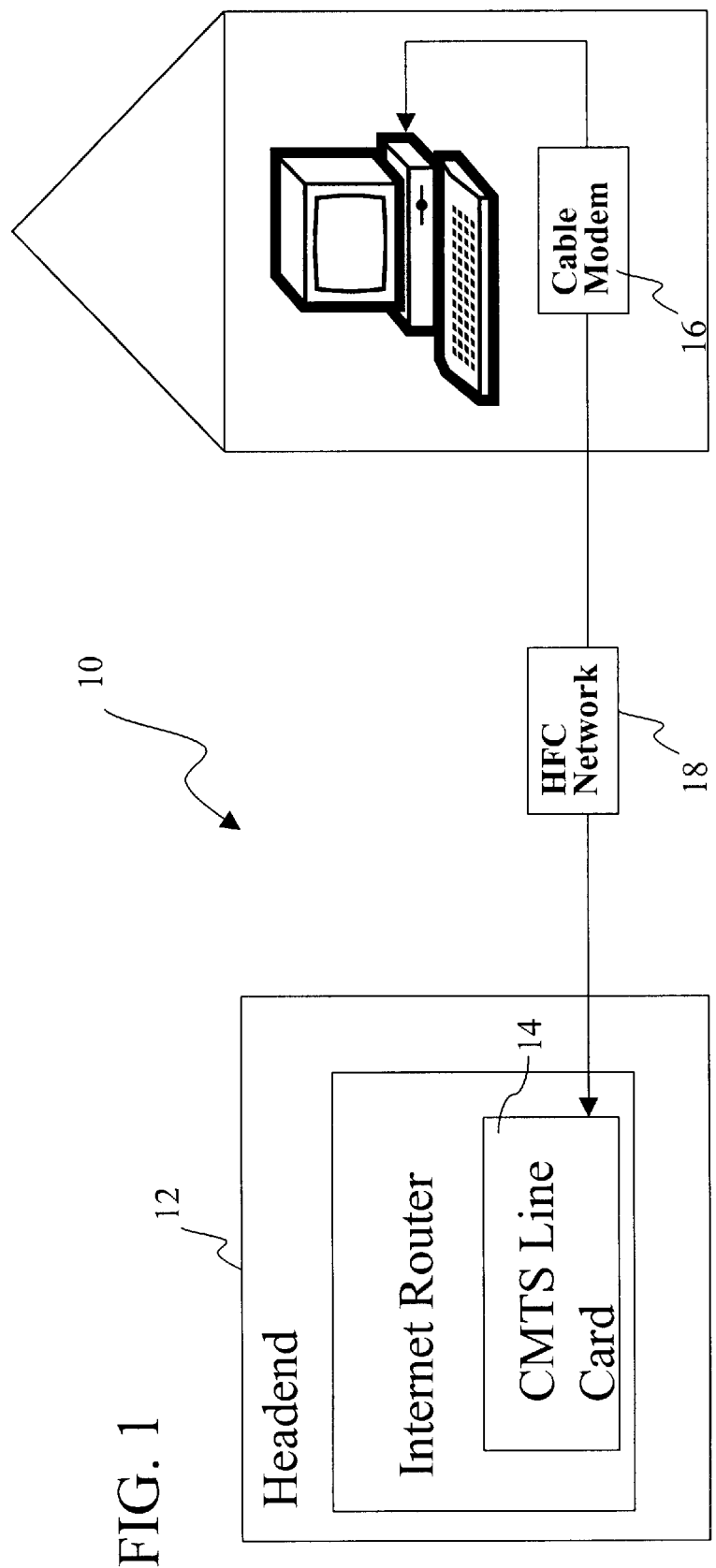
FIG. 1 is a simplified block diagram of a cable modem system demonstrating an implementation of an exemplary latency reduction system.

A simplified block diagram of a particular exemplary implementation is depicted in FIG. 1. An exemplary cable modem system 10 includes a headend 12 having a cable modem termination system (CMTS) 14 located at a cable company facility. A CMTS utilizing the present invention is disclosed in a U.S. Patent Application entitled "Method and Apparatus for the Reduction of Upstream Request Processing Latency in a Cable Modem Termination System" Ser. No. 09/652,718, filed on even date herewith by Lisa Denney, Angers Hebsgaard, and Robert J. Lee, the disclosure of which is incorporated fully herein by reference."

CMTS 14 functions as a modem which services a large number of subscribers each subscriber having customer premise equipment such as for example a cable modem 16 via a HFC network 18. One of ordinary skill in the art will appreciate that the described latency reduction system may be utilized to manage the power in all DOCSIS compatible network equipment. Therefore the description of an exemplary power management system in the context of a cable modem is by way of example only and not by way of limitation.

An exemplary embodiment of the present invention reduces the power requirements of cable modem 16 or other customer premise equipment by placing equipment attached to the cable modem into a low power or power off state. In the described exemplary embodiment, the forward tuning path and demodulation circuits of the cable modem are disabled in the low power state and two way communications are suspended. Prior to entering the low power state, cable modem 16 sets a wake up timer, the expiration of which terminates the low power state, returning cable modem 16 to full power, active operation. In an exemplary embodiment, the duration of the wake up timer may be designed to provide on the order of about a 90% sleep interval and a 10% active interval. A low power sleep interval may be in the range of about 1–4 seconds.

In the described exemplary embodiment, cable modem 16 reduces its average power by continuously establishing a low power state. Cable modem 16 returns to an active state when the sleep timer expires. However, upon returning to the active state cable modem 16 monitors the downstream traffic for local commands as well as the activity level of locally attached devices. If the low activity condition persists, cable modem 16 requests another sleep interval.

When returning to the full power active state, cable modem 16 or other customer premise equipment whose demodulation circuits have been disabled re-synchronize to CMTS 14 to resume accurate bi-directional communications over the HFC network. DOCSIS Downstream communications recovery time on the order of about 25–100 msec may be introduced by the synchronization operation. Consideration of this recovery time drives the selection of the sleep recovery timer because the downstream communication recovery operation is performed at full power.

Figure 2:
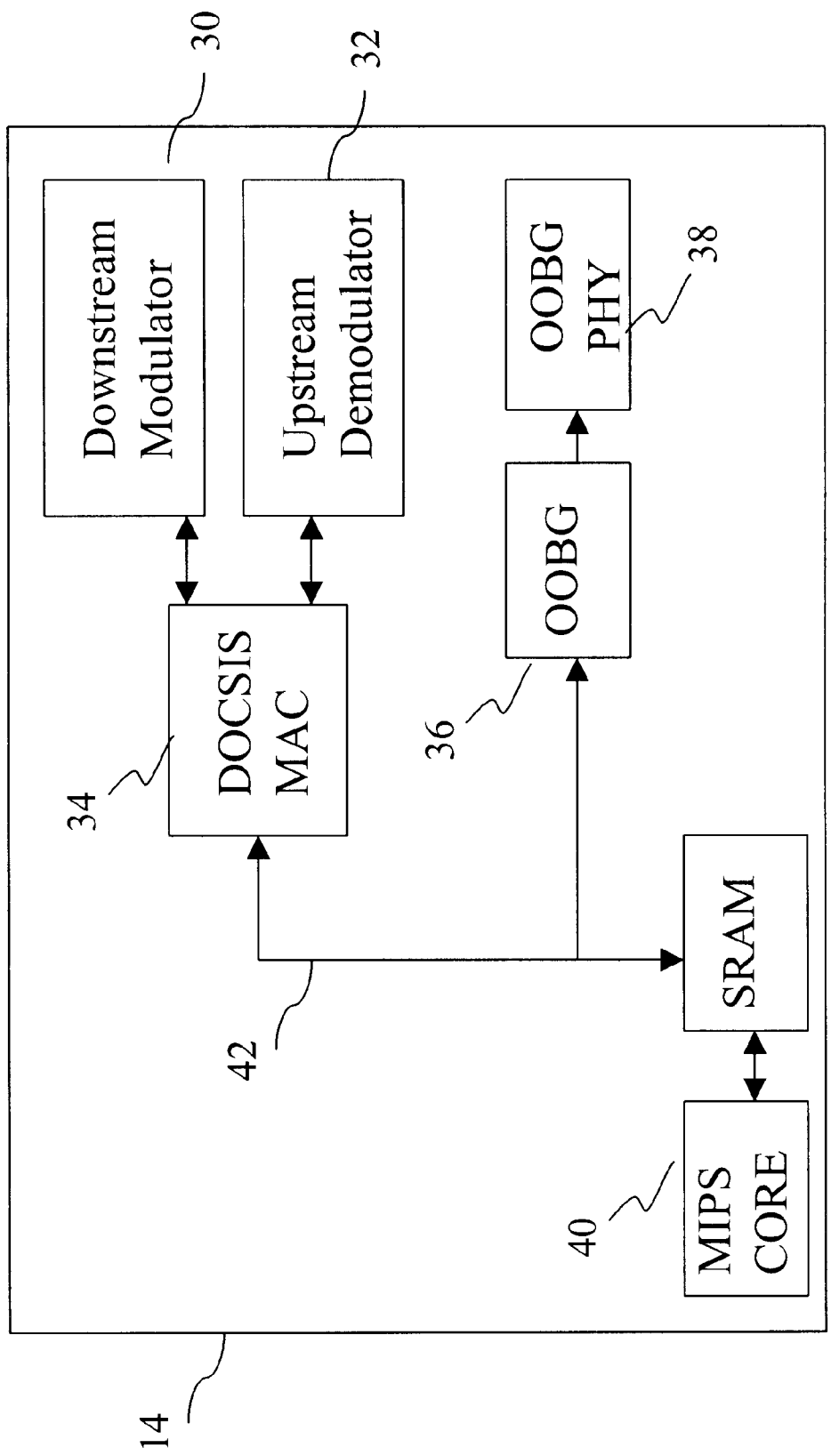
FIG. 2 is a simplified block diagram of a cable modem termination system in accordance with an exemplary embodiment of the present invention.

Referring to FIG. 2, cable modem termination system 14 includes a downstream modulator 30 for facilitating the transmission of data communications to the cable modems and an upstream demodulator 32 for facilitating the reception of data communications from the cable modems.

An exemplary CMTS preferably includes an out of band generator (OOBG) 36 that generates control messages and places the messages into an out-of-band data stream. An OOB PHY 38 transmits the OOB data stream to an out of band processor (OOBP) in an exemplary cable modem (not shown) that receives and processes the message. In accordance with the described exemplary power management system, CMTS 14 commands inactive cable modems into standby or sleep mode for relatively long periods of time. The cable modem returns to full power operation at the end of a predetermined interval. Upon reactivation, an internal processor may status the activity level of the cable modem peripherals. In the absence of activity, the cable modem may return to standby mode by requesting a sleep interval from CMTS 14.

Similarly, OOBG 36 of CMTS 14 or a local host may command a cable modem in a low power state, to terminate standby mode and to return to full processing capability via OOBG PHY 38. OOBG PHY 38 preferably provides a secondary fixed or narrow frequency range communications channel. OOBG PHY 38 preferably transmits a control message in the form of a cable modem address to activate a cable modem operating in a low power state. The OOB processor of the cable modem (not shown) compares the address of the message to the internal address of the cable modem. If the address matches that of the cable modem the internal cable modem processor returns the cable modem to full power operation. One of skill in the art will appreciate that the secondary OOBG PHY 38 may utilize any modulation type but is preferably constrained to have a fixed or relatively narrow frequency range and a relatively low bit rate.

CMTS 14 downstream modulator 30 facilitates the transmission of data communications to the cable modems and one or more upstream demodulators 32 facilitate the reception of data communications from the cable modems. Downstream modulator 30 may utilize either 64 QAM or 256 QAM in a frequency band in the range of 54 to 860 MHz to provide a data rate of up to 56 Mbps. Upstream demodulator 32 may use either QPSK or 16 QAM, in a frequency range of 5 MHz to 42 MHz, to provide a data rate of up to 10 Mbps. An exemplary upstream demodulator 32 may support bursts or continuous data. Upstream demodulator 32 may also provide forward error correction (FEC) encoding and pre-equalization, and preferably filters and modulates the data stream to provide a direct 0–65 MHz analog output.

A media access controller (MAC) 34 encapsulates data received from a data network interface with the appropriate MAC address of the cable modems on the system. Each cable modem on the system (not shown) has its own MAC address. Whenever a new cable modem is installed, its address is registered with MAC 34. The MAC address is necessary to distinguish data from the cable modems since all the modems share a common upstream path, and so that the system knows where to send data. Thus, data packets, regardless of format are mapped to a particular MAC address.

Upstream demodulator 32 accepts an analog signal and amplifies and digitizes the signal with an integrated programmable gain amplifier and A/D converter. The digitized signal is demodulated with recovered clock and carrier timing. Matched filters and adaptive filters remove multipath propagation effects and narrowband co-channel interference. An integrated decoder may also perform error correction and forwards the processed received data, in either parallel or serial MPEG-2 format to DOCSIS MAC 34.

OOBG 36 preferably supports a plurality of message formats, including for example, MPEG-2 pure messages, MPEG-2 private messages with a section syntax indicator designating the message as a private section, INTS messages, and GI protocol messages. OOBG generator 36 preferably does not distinguish between INTS messages and GI protocol messages.

Upstream demodulator 32, downstream modulator 30, and OOBG 36 are controlled by a MIPS core 40 via a serial interface 42 that may be compatible with a plurality of buses such as for example, the Motorola M-Bus or the Philips I2C bus. The interface consists of two signals, serial data (SDA) and serial clock (SCL), which may control a plurality of devices on a common bus. The addressing of the different devices may be accomplished in accordance with an established protocol on the two wire interface.

Figure 3:
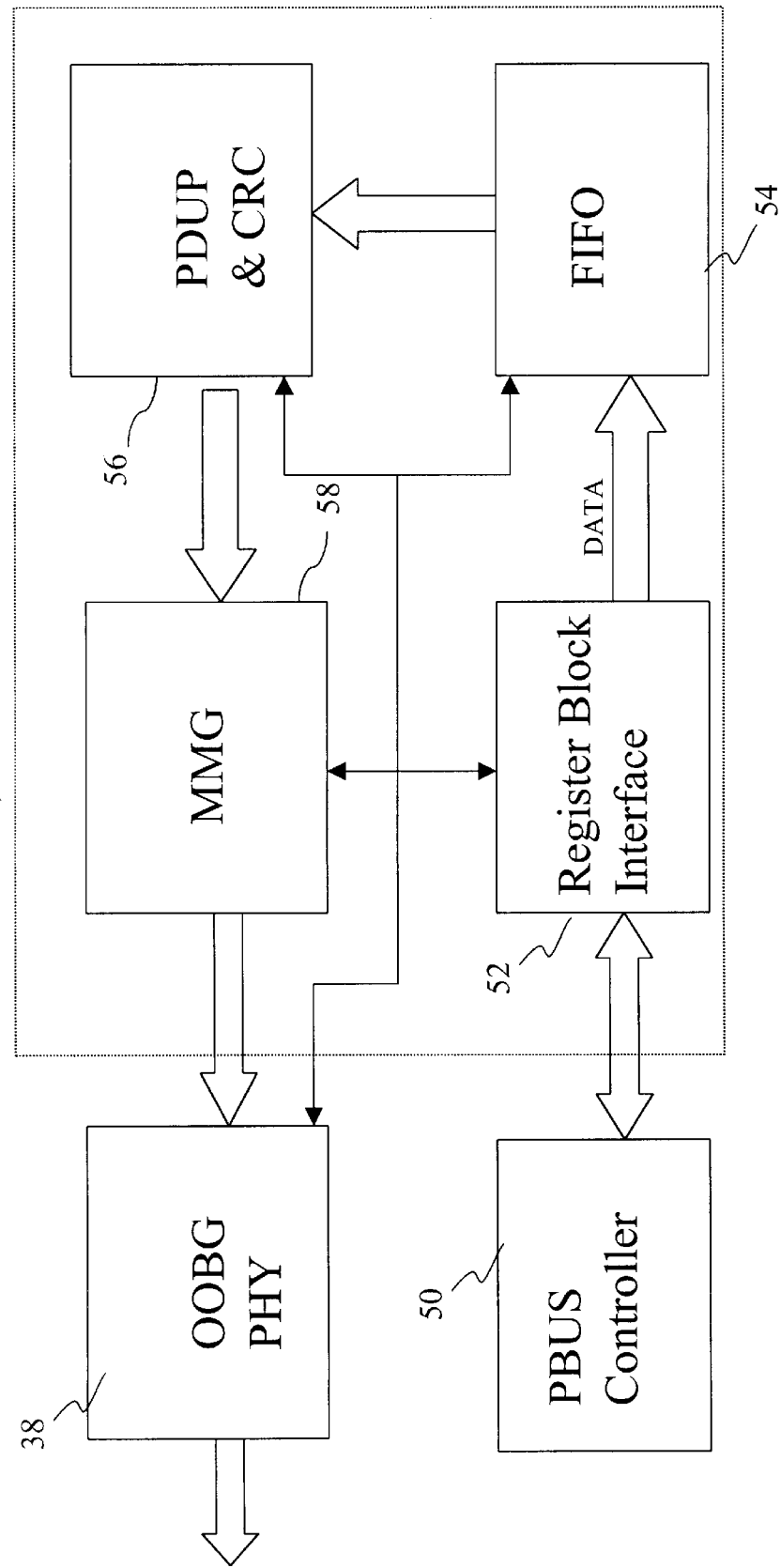
FIG. 3 is a simplified block diagram of an out of band generator that generates out of band messages in accordance with an exemplary embodiment of the present invention.

Referring to FIG. 3, an exemplary OOBG 36 exchanges messages and data with the MIPS core (not shown) via a PBUS controller 50. PBS controller 50 interfaces with a register block interface 52. Register block interface 52 provides a plurality of register settings to format data blocks to support a plurality of different modes including various debug and test modes. In addition, if the PBUS becomes overloaded, an exemplary system can forwarded a packet directly to registers, that may then be used to control OOBG PHY 38 directly, effectively bypassing the OOBG. Register block interface 52 forwards data packets to a FIFO 54 that stores bursts of data until a complete packet is received. FIFO 54 forwards complete data packets to a protocol data unit processor (PDUP) 56 that separates service data unit (SDU) packets into multiple MPEG-2 transport packets.

In addition PDUP 56 utilizes a cyclical redundancy check algorithm above the binary field to append an extra n-bit sequence, called the frame check sequence (FCS) to the remainder of every frame. The algorithm preferably treats all bit streams as binary polynomials. In one embodiment, PDUP 56 generates a FCS for an original frame. The FCS is preferably generated so that the resulting frame (the cascade of the original frame and the FCS), is exactly divisible by a pre-defined polynomial. In the described exemplary embodiment, PDUP 56 utilizes a CRC polynomial as proposed by ISO/IEC 13818-1 as follows:

$$G(x)=x^{32}+x^{26}+x^{22}+x^{16}+x^{12}+x^{11}+x^{10}+x^{8}+x^{7}+x^{6}+x^{4}+x^{2}+x^{1}+1.$$

In the described exemplary embodiment, MPEG-2 packets are forwarded to a MPEG message generator (MMG) 58 that acts as a protocol interface between PDUP 56 and OOBG PHY 38.

Figure 4:
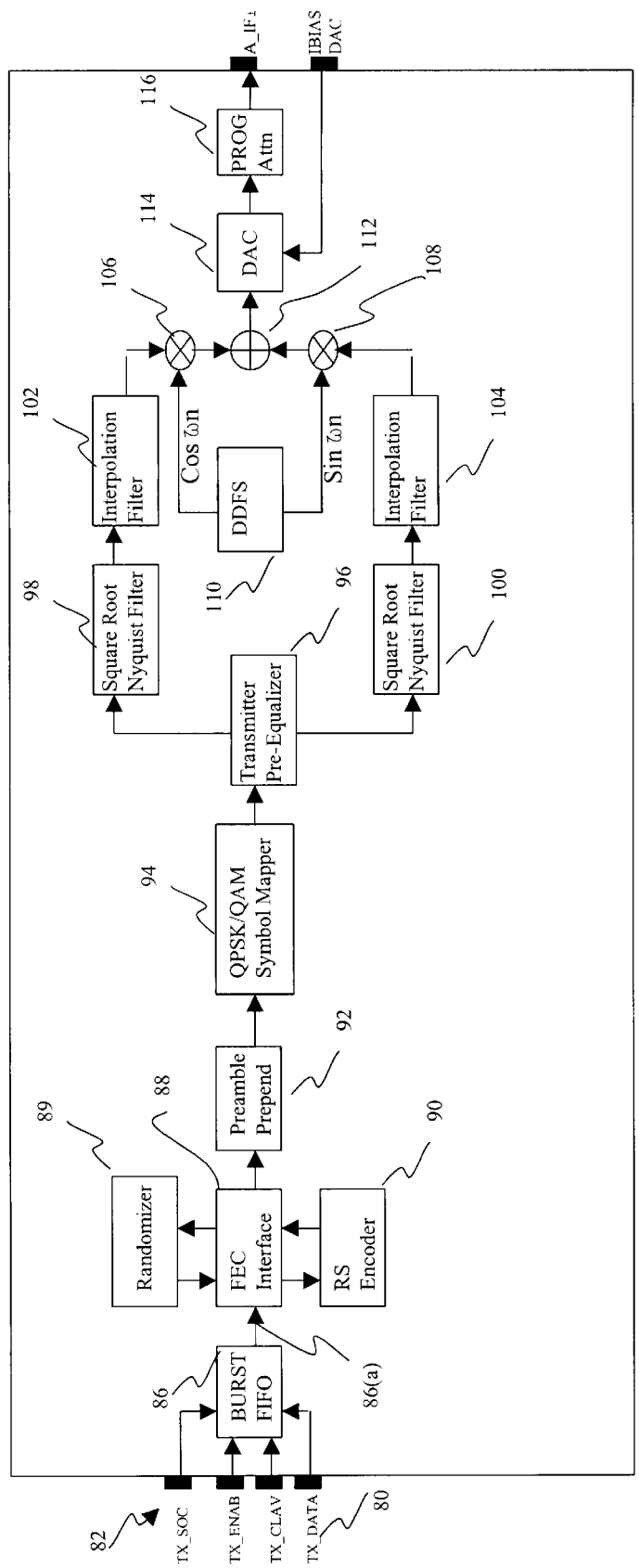
FIG. 4 is a simplified block diagram of an out of band PHY for transmitting out of band messages in accordance with an exemplary embodiment of the present invention.

Referring to FIG. 4, an exemplary OOBG PHY 38 for transmitting out of band messages accepts a serial data stream 80 and transmit control inputs 82 from the MMG (not shown). OOBG PHY 38 outputs an analog modulated, filtered, data burst containing data at a variable rate in one of a plurality of modulation formats including for example, n/4 DQPSK, QPSK or 16-QAM. The modulated burst may consist of a power, ramp up, preamble, data, FEC, ramp down, guard time and power down in each burst. OOBG PHY 38 may further provide a data bit clock for synchronizing data.

A burst FIFO buffer 86 receives serial data stream 80. Burst FIFO buffer 86 decouples the input data rate from the transmission data rate. Burst FIFO buffer 86 provides dual-access, allowing data to be input while a burst is actively being transmitted. Buffered data signals 86(*a*) are forwarded to a forward error correction (FEC) interface 88 that utilizes a block coding scheme to provide coding gain to minimize the effects of both Gaussian noise and impulse errors. FEC interface 88 may contain a randomizer 89 that randomizes the data to provide an even distribution of symbols in the constellation. In the described exemplary embodiment, randomizer 89 may be programmable to provide frame-synchronization or self-synchronization. In addition, the parallel to serial conversion of bytes entering randomizer 89 and serial to parallel conversion of bits leaving randomizer 89 can be programmed to be MSB or LSB first.

FEC interface 88 may further include a Reed Solomon encoder 90 that may be programmable to correct from zero to ten symbol errors within an RS block. FEC 88 may be configured to have randomizer 89 located either before or after RS encoder 90. Randomizer 89 and RS encoder 90 produce block codewords that are passed to a preamble prepend 92 and symbol mapping block 94.

In the described exemplary OOB PHY 38 a programmable length preamble of up to 1024 bits is prepended to the data stream following FEC encoder 88. The value of the preamble may also be programmed through control registers. The pretended control information may include various channel statistics, such as for example, FECOK, correctable FEC error, uncorrected FEC error, etc.

Symbol mapper 94 may map symbols into a plurality of modulation formats including for example n/4 DQPSK, QPSK and 16-QAM. In addition, modulation may further include differential or non-differential encoding. A transmitter pre-equalizer 96 accepts in-phase (I) and quadrature-phase(Q) baseband signals output by symbol mapper 94. Transmitter pre-equalizer 96 may be programmable to provide cancellation of inter-symbol interference (ISI).

Square root Nyquist filters 98 and 100 spectrally shape in-phase (I) and quadrature-phase(Q) baseband signals output by pre-equalizer 96. Nyquist filters 98 and 100 are preferably programmable with excess bandwidth on the order of about, $\alpha=0.25/0.5$. The maximum passband ripple of these filters is preferably less than about 0.05 dB and the minimum stopband attenuation is preferably greater than about 60 dB.

Variable interpolation filters 102 and 104 interpolate shaped, in-phase (I) and quadrature-phase(Q) baseband signals output by Nyquist filters 98 and 100 respectively up to the sample rate. Variable interpolation filters 102 and 104 maintain the fidelity of the signal at the output of the shaping filters with no appreciable degradation of the overall responses. Multipliers 106 and 108 modulate the outputs of variable interpolation filters 102 and 104 onto quadrature carriers generated by a digitally tunable frequency synthesizer 110. This allows the spectrum to be centered on a programmable IF frequency of up to one-half of the sampling rate.

A combiner 112 combines modulated I and Q signals and a digital to analog (D/A) converter 114 converts combined modulated signal to an analog waveform. DAC 114 preferably supports sample rates on the order of about 200 MHz. A programmable attenuator 116 may incrementally attenuate analog output signal by a maximum of about 25 dB. The attenuated output signal is forwarded to an out of band receiver of the cable modem (not shown). One of ordinary skill in the art will appreciate that the present invention is not limited to the described secondary OOBG PHY. Rather the present invention is equally applicable for use with any secondary communication channel operating at a secondary fixed or narrow frequency range below the bandwidth of the primary communications channel.

Figure 5:
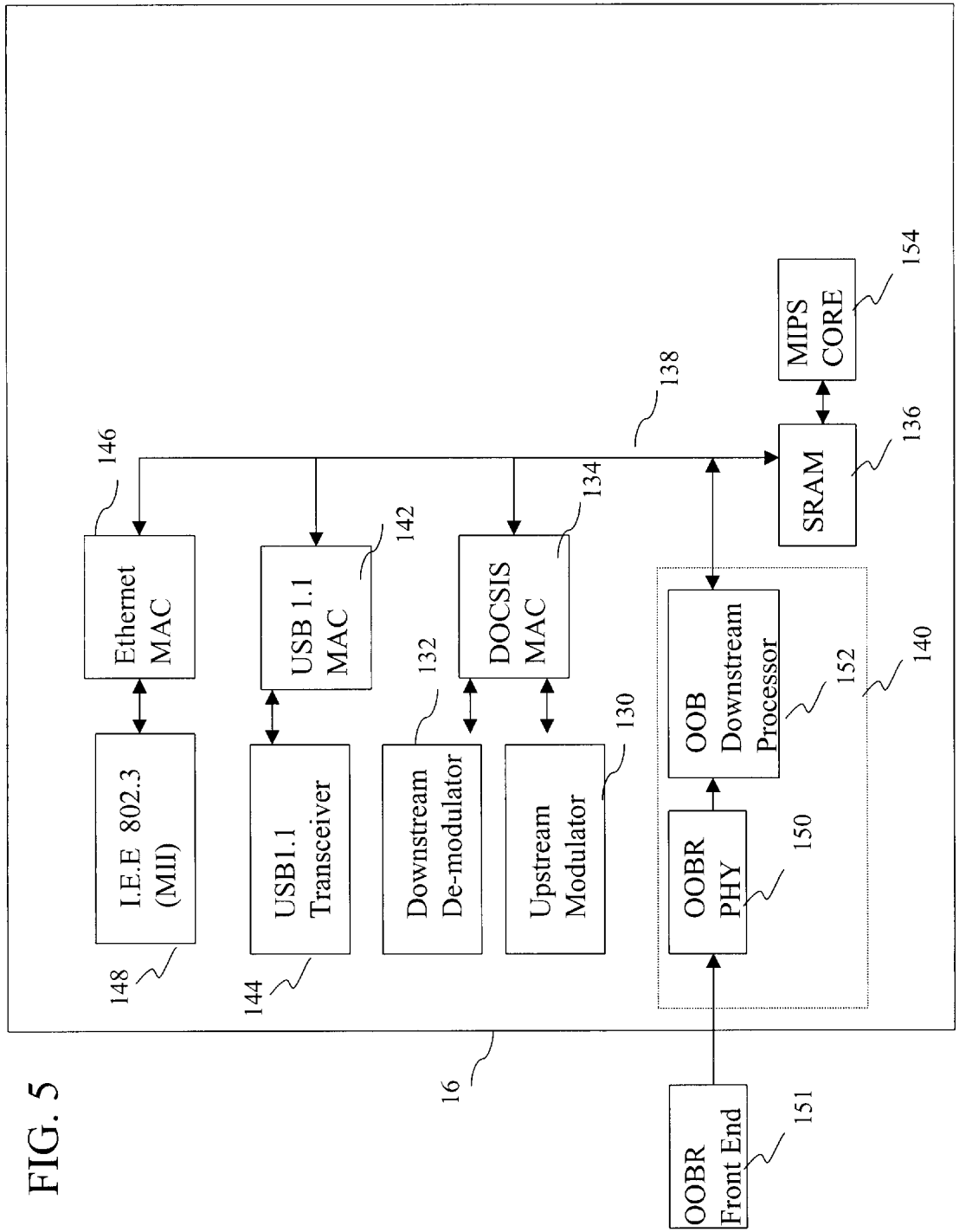
FIG. 5 is a simplified block diagram of cable modem that provides Data Over Cable Service Interface Specification (DOCSIS) compliant two way communication with the CMTS of FIG. 2 in accordance with an exemplary embodiment of the present invention.

An exemplary cable modem is shown schematically in FIG. 5. The described exemplary embodiment may provide an integrated single chip solution that is compliant with the Data Over Cable Service Interface Specification (DOCSIS). The described exemplary embodiment can provide integrated functions for communicating with far end devices via the CMTS (not shown). For example, a QPSK upstream modulator 130 transmits data to a far end data terminating device, a QAM downstream demodulator 132 receives data from the far end data terminating device via a CMTS. Upstream modulator 130 and downstream demodulator 132 interface with a DOCSIS MAC 134. DOCSIS MAC 134 implements the downstream portions of the DOCSIS protocol. DOCSIS MAC 134 extracts DOCSIS MAC frames from MPEG-2 frames, processes MAC headers, and filters and processes messages and data. Downstream data packets and message packets may then be placed in system memory 136 via an internal system bus (ISB) 138.

In addition, a QPSK out of band downstream receiver 140 receives out of band, messages from the out of band generator of the CMTS (not shown). In the described exemplary embodiment the OOB messages are encoded in accordance with the MPEG-2 format. In addition, the described cable modem can support multiple peripherals in accordance with a variety of protocols. For example, a universal serial bus transceiver 144 and USB MAC 142 provide transparent bi-directional IP traffic between communications devices operating on a USB such as for example a PC workstation, server printer or other similar devices and the far end data terminating device. Additionally, an I.E.E.E. 802.3 compliant media independent interface (MII) 148 in conjunction with an Ethernet MAC 146 may also be included to provide bi-directional data exchange between communications devices such as, for example a number of PCs and or Ethernet phones and the far end data terminating device.

Those of skill in the art will appreciate that the present invention is not limited to the peripherals shown in FIG. 5. For example, the present invention may be used in a voice over cable system where cable modem 16 includes a voice and data processor for processing and exchanging voice, as well as fax and modem data over packet based networks. Therefore, the described exemplary cable modem embodiment is by way of example only and not by way of limitation.

An exemplary secondary OOB receiver 140 includes an out of band receiver (OOBR) PHY 150 and an OOB downstream processor 152, that receive and process asynchronous wake-up commands from the out of band generator of the CMTS (not shown). An OOBR front end 151 accepts an out of band analog signal. OOBR front end preferably utilizes a frequency signal synthesized by the a frequency agile local oscillator (not shown) on the cable modem 16 to down convert any signal in the range of about 70–130 MHz to a SAW centered IF signal. OOBR PHY 150 accepts the IF signal and amplifies and digitizes the signal with an integrated programmable gain amplifier and an A/D converter.

OOBR PHY 150 demodulates the signal with recovered clock and carrier timing, filters the signal and passes soft decisions to an ITU-T J.83 Annex A/B/C compatible decoder. Integrated decoders perform error correction and forward the processed received data, in either parallel or serial MPEG-2 format to OOB downstream processor 152.

OOB downstream processor 152 parses MPEG-2 compliant transport headers and messages. OOB downstream processor 152 preferably parses messages with a plurality of protocols, including for example, MPEG private, INTS and GI STARVUE and stores the messages in a memory buffer. ISB 138 facilitates two way communication between OOB downstream processor 152 and MIPS core 154. For example, MIPS core 154 may access internal registers and memory contained within OOB downstream processor 152 via ISB 138. In addition, OOB downstream processor 152 may communicate interrupts to MIPS core 154 when service is needed via ISB 138.

In the described exemplary embodiment, OOB Downstream Processor 152 contains a message filter (not shown) to identify the intended destination address of messages arriving at cable modem 16 from the CMTS. If the message filter identifies the message destination address as the address for the current device, OOB Downstream Processor 152 issues an interrupt signal to MIPS core 154 via ISB 138. In an exemplary embodiment of the present invention, the CPU (not shown) of MIPS core 154 contains circuitry to permit a low power sleep state. MIPS core 154 may be programmed such that an interrupt arriving from OOB Downstream Processor 152 via ISB 138 will return M-PS core 154 to an operating state from the sleep state.

FIG. 6 illustrates the frequency spectrum of a DOSCIS compatible network. The upstream carrier provides the transmission path for the cable modems to communicate information to the CMTS. The internal framing of the data In this carrier is described by the well-known DOCSIS RF specification. The downstream carrier provides a transmission path for the CMTS to communicate to the cable modems. The internal framing of this carrier is described in the well-known DOCSIS RF specification (Data-Over-Cable Service Interface Specification, Radio Frequency Interface Specification SP-RFI-I05-991105), that is incorporated herein by reference.

The OOB receiver supports asynchronous wake up or activation commands from the CMTS to the cable modem. The OOB receiver can support either a baseband I/Q signal or an IF centered signal. Referring to FIG. 7, in IF mode, out of band receiver (OOBR) front end 151 interfaces with cable modem 16. The OOBR front end 151 receives a digitally modulated signal 160 in the frequency range of 70–130 MHz. A variable gain amplifier (VGA) 162 amplifies the incoming digital signal 160. In an exemplary embodiment of the present invention, cable modem 16 may provide a closed loop AGC signal 164 that may be used to control the gain of VGA 162. A mixer 166 mixes the amplified received signal 162(a) with a sinusoidal frequency signal 168, in the frequency range of 114–174 MHz, to convert the amplified received signal to an IF signal centered at 44 MHz. The frequency signal 168 may be synthesized by a frequency agile local oscillator (not shown) on cable modem 16. An amplifier 170 may amplify the mixed signal 166(a) and a surface acoustic wave (SAW) filter 172, centered at 44 MHz filters, filters the amplified signal 170(a) and forwards an IF signal centered at 44 MHz to an RF input 174 of cable modem 16.

Referring to FIG. 8, in the described exemplary embodiment, the OOB channel may be a sequence of MPEG frames consisting of 188 bytes. This framing structure is described by ISO/IEC 13810-1, the contents of which are incorporated herein by reference.

Figure 9:
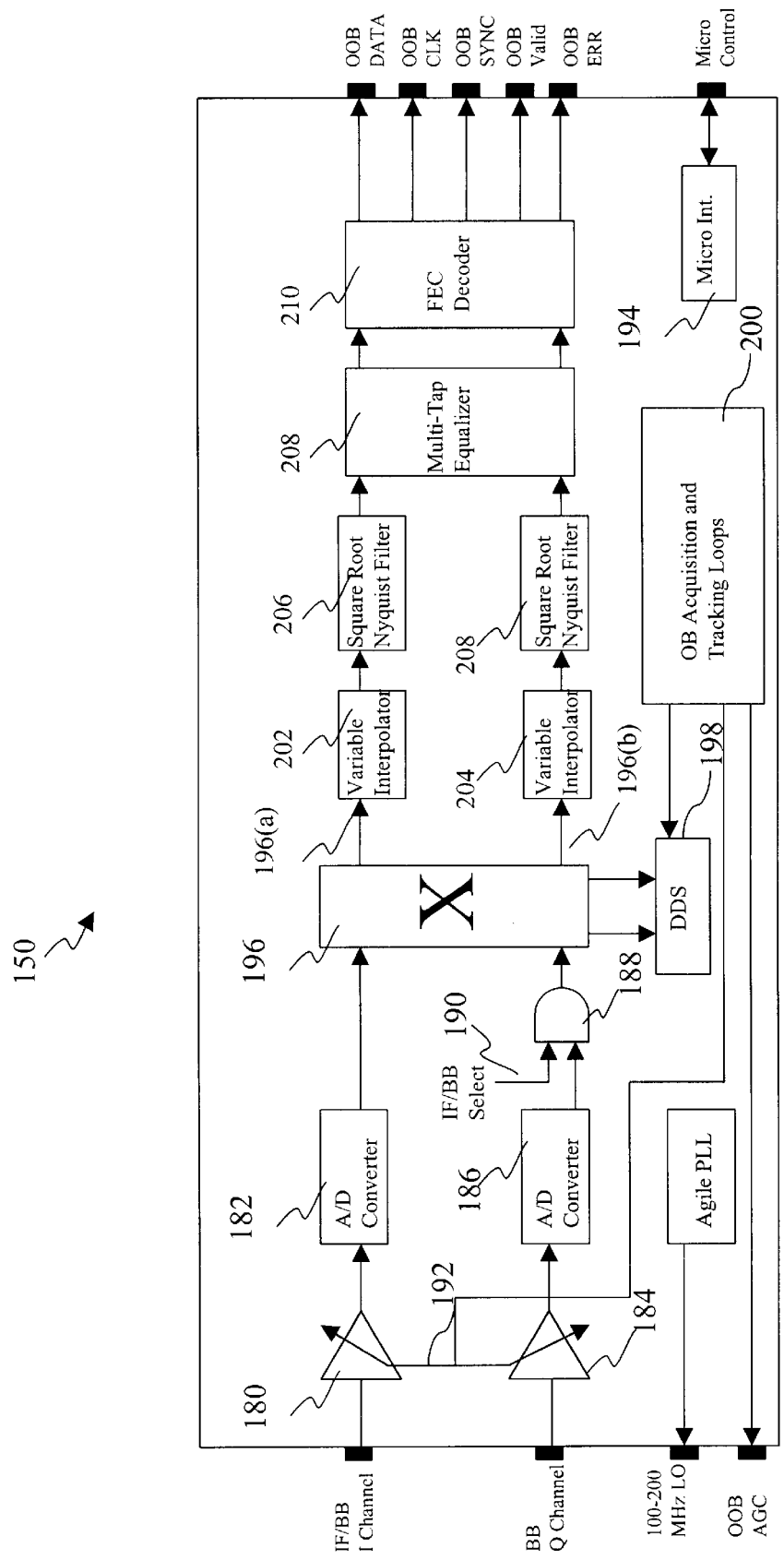
FIG. 9 is a simplified block diagram of an out of band receiver PHY in accordance with an exemplary embodiment of the present invention.

An exemplary OOBR PHY 150 is shown in FIG. 9. In IF mode a programmable gain amplifier 180, amplifies an IF centered signal. The amplified signal is then sub-sampled by an A/D converter 182, at a rate that is at least about eight times the symbol rate. In baseband mode, the complex baseband signal is amplified by dual amplifiers 180, 184 and sub-sampled by dual A/D converters 182, 186. The down-sampled quadrature channel is preferably input to an "AND" logic circuit 188 along with an IF/BB select signal 190. AND logic circuit 188 selectively enables further processing of the quadrature channel in accordance with the reception of an IF centered signal or a baseband I/Q signal.

The described exemplary out-of-band receiver PHY 150 includes two automatic gain control loops (AGC). A first loop (not shown) controls 192 programmable gain amplifiers 180 and 184, providing an automatic gain control (AGC) function. A second loop (not shown) is closed at the tuner and is referred to as the outer tuner loop or the delayed-AGC loop. The first and second loops may include a power estimator, a threshold comparator and a first order loop filter. The filter output controls the gain of the programmable gain amplifiers 180, 184 in the case of the first loop and is fed into a sigma-delta modulator (not shown) for the creation of an analog control voltage in the case of the outer loop.

The gain of each loop may be independently set via the micro-controller interface 194. In the described exemplary OOB receiver, the power of the internal IF signal is estimated and compared to a programmable threshold. If the estimated power exceeds the threshold, the appropriate AGC integrator is incremented by a programmable value. If the estimated power is less than the threshold, the appropriate AGC integrator is decremented by a comparable amount.

An OOB digital demodulator 196 receives either an IF sampled input from the A/D converter 182 or a near baseband signal from dual A/D converters 182, 186 and down converts it to true-baseband. Digital demodulator 196 demodulates the digitized output(s) of the A/D converter(s) 182, 186 with recovered clock and carrier timing. Digital demodulator 196 includes a full quadrature mixer that mixes the digitized outputs of the A/D converters with a complex data stream generated by a direct digital synthesizer (DDS) 198. DDS 198 may be controlled by timing recovery loop 200.

Timing recovery loop 200 may include a timing error discriminant, a loop filter, and a digital timing recovery block that controls the digital re-sampler. In the described exemplary embodiment, the carrier frequency/phase recovery and tracking loops are all digital loops which simultaneously offer a wide acquisition range and a large phase noise tracking ability. The loops may use decision directed techniques to estimate the angle and direction for phase/ frequency compensation. The loops can be filtered by integral-plus-proportional filters, in which the integrator and linear coefficients of the filter are programmable to provide means for setting the loop bandwidth. The upper bits of the loop filter can control direct frequency synthesizer 198, providing both accurate frequency generation and fine phase resolution.

Matched interpolation filters 202, 204 convert mixer outputs 196(*a*), 196(*b*) to in-phase (I) and quadrature-phase (Q) baseband signals, that are correctly sampled in both frequency and phase. The I and Q baseband signals are then filtered by dual square-root Nyquist filters 206, 208 to reduce inter-symbol interference. Nyquist filters 206, 208 can accommodate roll-off factors in the range of about 30–50%. The described exemplary OOB demodulator includes a configurable, multi-tap decision feedback equalizer (DFE) 208. In the described exemplary embodiment, a four tap equalizer is used to remove inter-symbol interference generated by worst case coaxial cable channels including a wide variety of impairments such as un-terminated stubs.

In the described exemplary embodiment, the equalizer coefficients are updated every baud cycle for rapid convergence. The output of adaptive DFE 208 is input to a forward error correction (FEC) decoder 210. The described exemplary FEC decoder 210 consists of four layers, namely frame synchronization, de-interleaving, Reed-Solomon decoding, and de-randomization. The layers preferably support both DigiCipher II and DAVIC out of band FEC specifications.

In the described exemplary embodiment, hard decisions are input into the frame synchronization block which locks onto the inverted sync bit pattern. MIPS core (rot shown) sets the characteristics of the frame synchronization acquisition and retention via micro control interface 194. Once synchronized, data interleaving is removed by a convolution de-interleaver. The de-interleaver may be based on the Ramsey III approach. After de-interleaving the data symbols are processed by a Reed-Solomon decoder which corrects symbol errors in each block. The decoded symbols are then de-randomized, which substantially undoes the randomization inserted at the modulator. The de-randomized output consists of MPEG-2 serial or parallel data, packet sync and a data clock.

Referring back to FIG. 5, OOB downstream processor 152 parses MPEG-2 compliant transport headers and messages. The OOB downstream processor 152 preferably provides the capability to parse messages with a plurality of protocols, including for example, MPEG private, INTS and GI STARVUE and stores the messages in a memory buffer. In the described exemplary embodiment, OOB downstream processor 152 interfaces with a MIPS core 154 via ISB 138.

Figure 10:
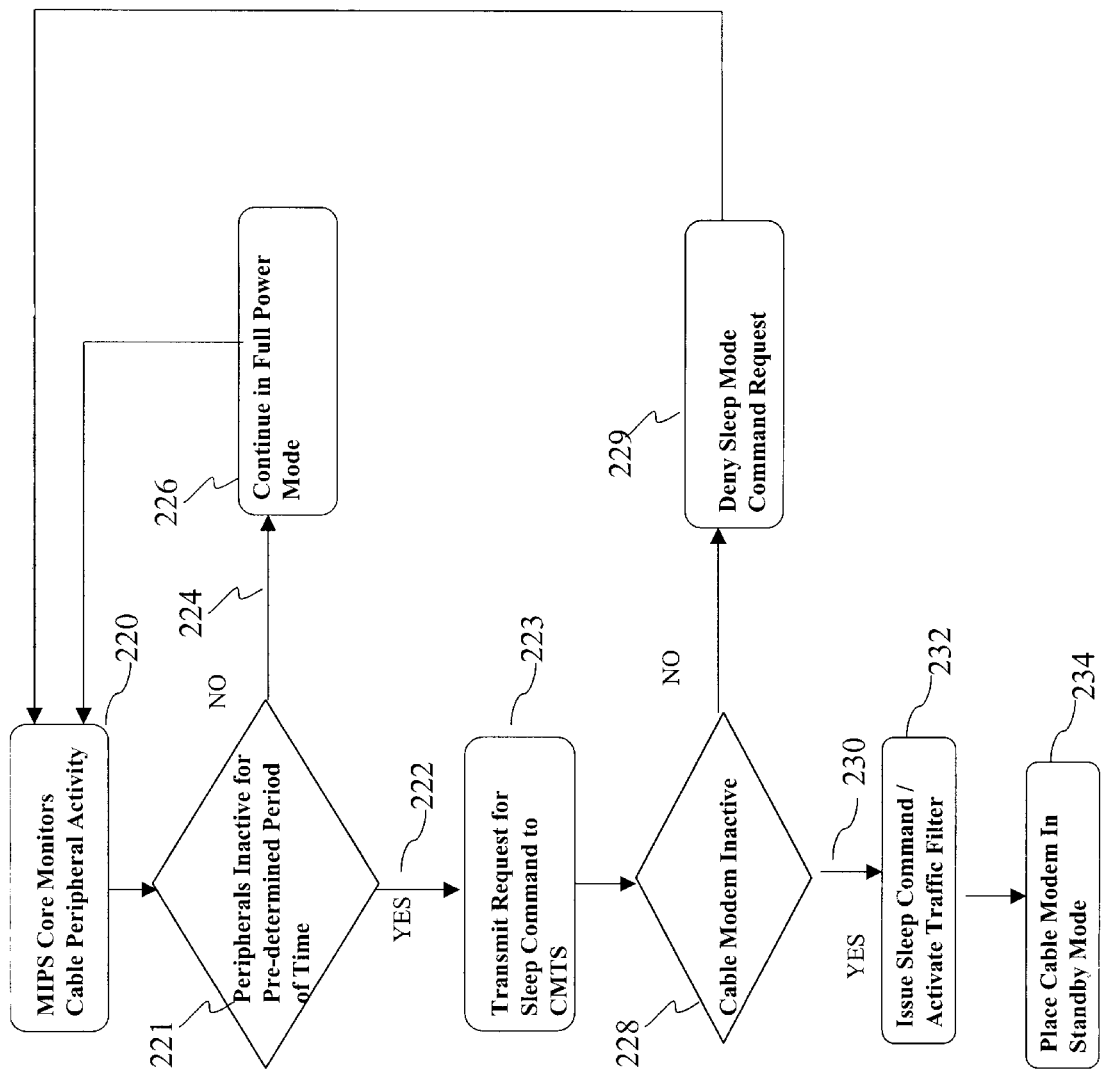
FIG. 10 is a flow diagram demonstrating the operation of an exemplary latency reduction system in accordance with an exemplary embodiment of the present invention.

Referring to FIG. 10, in operation, the cable modem and CMTS manage the low power mode or sleep state of the cable modem. MIPS core monitors the activity of the cable modem peripherals 220 such as for example the USB MAC, Ethernet or Hook detection circuitry (not shown). Activity monitoring procedures vary in accordance with the interface at issue. For example, packet interfaces, such as for example, Ethernet or USB simply reset a timer each time a packet is received or transmitted via the interface. If the timer expires, and remains expired because no packets have arrived, the interface is said to be inactive. Traditional telephony interfaces on the other hand are in the active state when the handset is off hook or not in the cradle. If the handset is on hook or in the cradle, the interface is in the inactive or idle state.

If the peripherals are inactive for a predetermined, programmable length of time 222, MIPS core generates a sleep command request that is forwarded to the CMTS via upstream modulator 223. If the peripherals have not been inactive for the predetermined length of time 224, the cable modem remains in full power mode 226 utilizing primary DOCSIS communication channels.

In the described exemplary embodiment all interfaces connected to the cable modem that are monitored by MIPS core must be inactive for a predetermined timeout interval. In an exemplary embodiment, the time out interval is a programmable value allowing the service operator to select any suitable timeout interval. However, the timeout interval is preferably in the range of about one minute to fifteen minutes.

The upstream demodulator of the CMTS receives and processes a burst containing the request for a sleep command. The processed burst is forwarded to the DOCSIS MAC that extracts DOCSIS MAC frames from MPEG-2 frames, processes MAC headers, and filters and extracts the message frame containing the request message. The message packets may then be placed in system memory via an internal system bus.

The CMTS processor receives the message from memory and upon recognizing a sleep request message, ascertains the activity level for the cable modem 228 to determine whether to grant the sleep request. In the described exemplary embodiment, the activity level of a cable modem may be determined by looking at the time of the last message transmission to the requesting cable modem. If the time elapsed since the last message is less than a programmable variable or if the CMTS is actively engaged in the two way exchange of information with the cable modem the sleep request is denied 229.

However, if the CMTS is not actively engaged in two way message exchange of information with the cable modem and the time elapsed since the last message is greater that the programmable variable the CMTS grants the sleep request 232. A sleep command is then forwarded to the cable modem via the downstream modulator. In addition, the CMTS activates a downstream filter that captures communications addressed to cable modems that have been placed in the low power or sleep state. The captured communications are inspected for priority. In the described exemplary embodiment the traffic filter may discard best effort communications but initiates the communication of a wake-up message to the cable modem, via the secondary channel for high priority traffic.

Upon receipt of a sleep command, MIPS core may initiate a shutdown sequence to place the cable modem into a low power or standby mode 234 if the internal state of the cable modem indicates that the attached equipment is still inactive.

Figure 11:
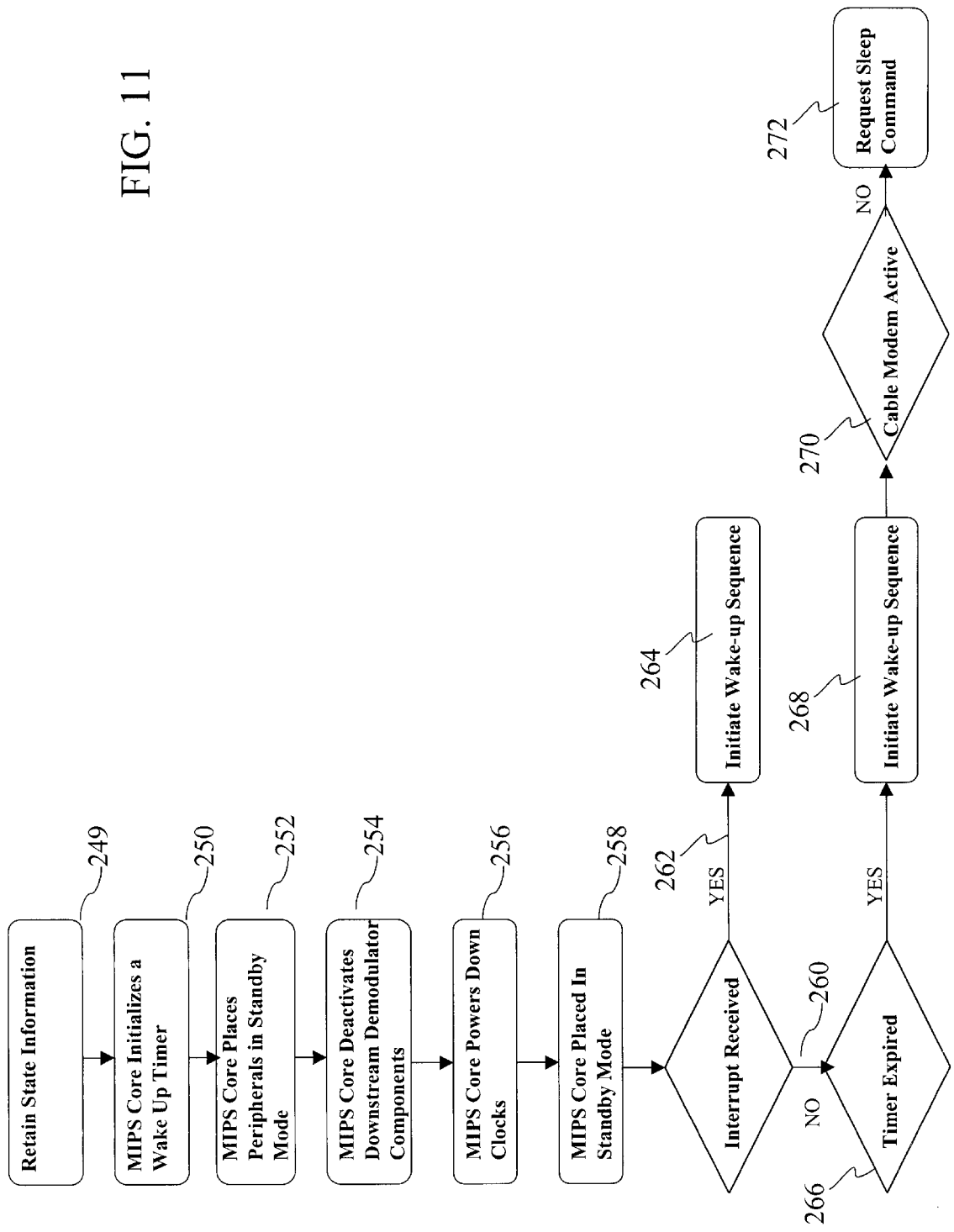
FIG. 11 is a flow diagram of an exemplary shutdown used to place customer premise equipment in a low power state in accordance with an exemplary embodiment of the present invention.

Referring to FIG. 11, in the described exemplary embodiment, the MIPS core executes a shutdown sequence by retaining certain state information 249. For example, MIPS core stores the operating frequency, equalization coefficients, data rate and modulation format under use at the time the sleep command was issued. The state information may be used to reduce the time required to reacquire synchronization when the cable modem returns to normal power operation. MIPS core also initializes a wake up timer 250, and then places the peripherals in standby mode 252. In the described exemplary embodiment, the MIPS core transmits write control register values via the ISB to each peripheral that place that peripheral into a low power mode. MIPS core also deactivates the following downstream demodulator components the AGC, carrier loop, baud loop and equalizer 254, and powers down clocks 256 to each peripheral. MIPS core is then placed in standby mode 258 by executing a sleep instruction.

A sleep cycle may be terminated by expiration of the timer or by an interrupt issued by any of the connected peripherals. If an interrupt is received 262 via the ISB, MIPS core initiates a wake up sequence 264 and the cable modem returns to full power operation to process the message that stimulate the wake up message. When the wake up timer lapses at the end of the predetermined interval 266, MIPS core initiates activation of the cable modem 268. However, in the absence of network activity 270 the cable modem may request another sleep mode cycle 272.

Figure 12:
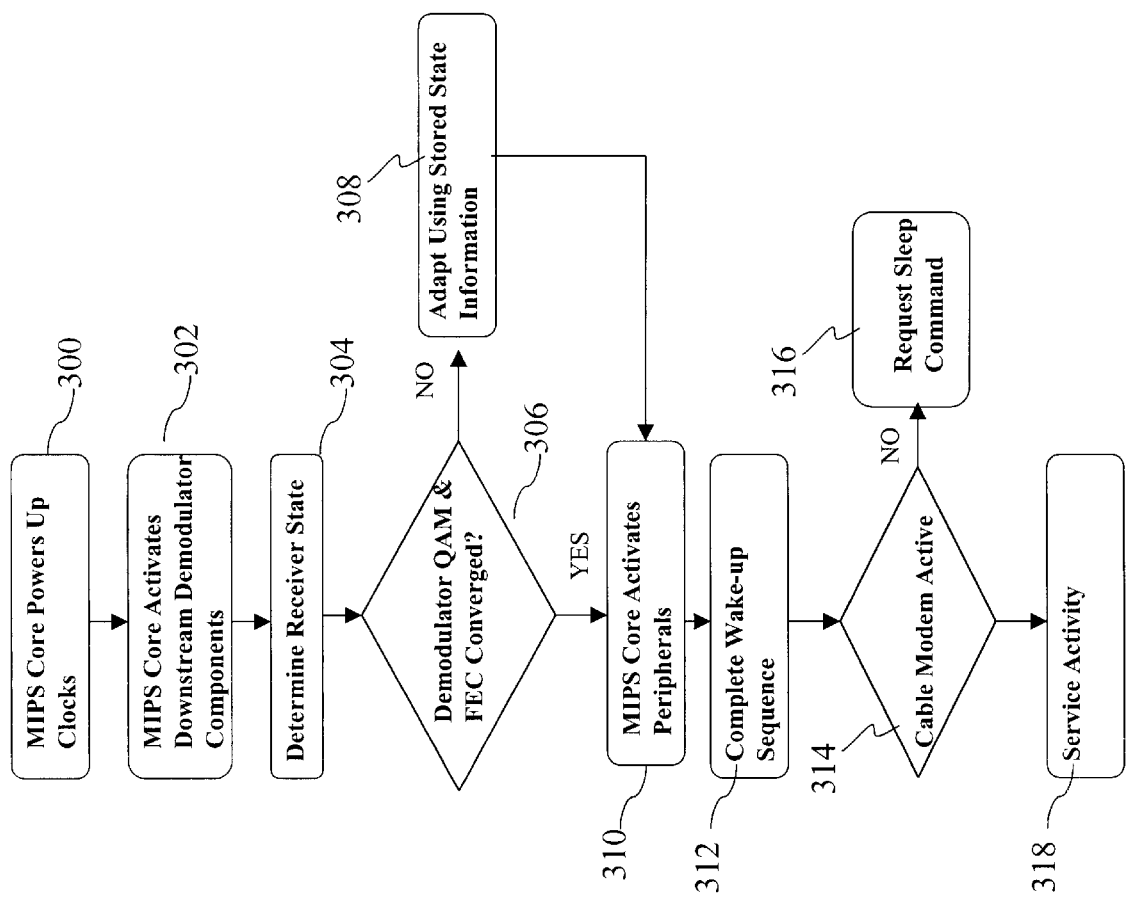
FIG. 12 is a flow diagram of an exemplary activation sequence used to return customer premise equipment to full power active mode in accordance with an exemplary embodiment of the present invention.

Referring to FIG. 12, in the described exemplary embodiment, the following sequence may be used to activate the cable modem. First MIPS core powers up the system clocks 300 that are used by the peripherals to perform their internal process operations. In the described exemplary embodiment, each peripheral may disable its clock independently of other peripherals. The MIPS core utilizes ISB write operations to place the downstream demodulator AGC, baud loop, carrier loop and equalizer into an operational state, removing the low power state 302.

The MIPS core may then determine the receiver state 304 by reading state information via the ISB interface. MIPS core utilizes the stored state information to determine whether downstream demodulator QAM and FEC are converged 306, based on the restored state information retained at the start of the shutdown sequence. If the receiver indicates that it has not reacquired the carrier and that it has not converged on the downstream data, then the downstream state has changed while the modem was in the sleep state. The receiver uses the retained state information to re-converge on the downstream data 308. MIPS core then utilizes ISB operations to activate the cable modem peripherals 310. The MIPS core establishes active operating conditions in the peripheral control registers and removes the low power state previously set via the ISB, thereby restoring normal operation 312.

When the cable modem completes the power up cycle, the MIPS core determines the activity level of the peripherals 314. If the peripherals continue to be inactive the MIPS core requests another sleep cycle from the CMTS 316. Otherwise, the cable mode will remain active and begin to service the activity of the connected equipment.

Although a preferred embodiment of the present invention has been described, it should not be construed to limit the scope of the appended claims. This invention is not to be limited to the specific arrangements and constructions shown and described. Rather the present invention may be utilized for power management in all DOCSIS compatible networks utilizing DOCSIS compatible equipment arrangements. Those skilled in the art will understand that various modifications may be made to the described embodiment.

Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A two way communication system comprising:
   a local host having a first primary broadband communication channel and a secondary out of band transmitter; and
   customer premises equipment having a primary communication channel for communicating with said first primary broadband communication channel of said local host and a secondary low power out of band receiver that receives out of band control signals from said out of band transmitter during low power operation of said customer premises equipment;
   wherein said customer premises equipment further comprises one or more peripherals that provide two way communication with one or more communication devices coupled to said customer premises equipment and a processor that monitors activity level of said customer premises equipment and requests a sleep command from said local host when said peripherals have been inactive for a predetermined duration; and
   wherein said local host further comprises a host processor that processes said request for sleep command and grants said request in absence of traffic for said customer premises equipment and wherein said host processor activates a downstream filter that buffers communications addressed to said customer premises equipment when said customer premises equipment has been placed in low power mode.

2. The two way communication system of claim 1 wherein said host processor discards best effort communications buffered in said downstream filter.

3. The two way communication system of claim 1 wherein said host processor generates a wake-up message when high priority communications are received by said downstream filter.

4. The two way communication system of claim 3 wherein said out of band transmitter comprises an out of band generator that processes said wake-up message and forwards a wake-up interrupt to said customer premises equipment via an out of band generator PHY.

5. The two way communication system of claim 4 wherein said out of band generator comprises a protocol data unit processor that separates service data unit packets generated by said host processor into one or more transport packets.

6. The two way communication system of claim 5 wherein said out of band generator further comprises a message generator for interfacing said protocol data unit processor with said out of band generator PHY.

7. The two way communication system of claim 4 wherein said out of band generator PHY comprises a symbol mapper for mapping said wake-up interrupt into one or more modulation formats.

8. The two way communication system of claim 7 wherein said out of band generator PHY further comprises a modulator for modulating said mapped wake up interrupt onto quadrature carriers.

9. A two way communication system comprising:
   a local host having a first primary broadband communication channel and a secondary out of band transmitter; and
   customer premises equipment having a primary communication channel for communicating with said first primary broadband communication channel of said local host and a secondary low power out of band receiver that receives out of band control signals from said out of band transmitter during low power operation of said customer premises equipment;
   wherein said secondary low power out of band receiver comprises an out of band receiver PHY and an out of band receiver processor for receiving and processing asynchronous wake-up commands from the local host; and wherein said out of band receiver PHY comprises a frequency agile local oscillator for down converting channels within a predetermined bandwidth to an intermediate frequency signal.

10. A two way communication system comprising:

a local host having a first primary broadband communication channel and a secondary out of band transmitter; and customer premises equipment having a primary communication channel for communicating with said first primary broadband communication channel of said local host and a secondary low power out of band receiver that receives out of band control signals from said out of band transmitter during low power operation of said customer premises equipment;

wherein said secondary low power out of band receiver comprises an out of band receiver PHY and an out of band receiver processor for receiving and processing asynchronous wake-up commands from the local host; and wherein said out of band receiver PHY comprises a digital demodulator for demodulating said asynchronous wake-up commands.

11. The two way communication system of claim 10 wherein said digital demodulator comprises a full quadrature mixer that mixes said asynchronous wake-up commands with a complex data stream generated by a direct digital synthesizer to form in phase and quadrature components.

12. The two way communication system of claim 11 wherein said out of band receiver PHY further comprises a decision feedback equalizer for removing inter-symbol interference in said in phase and quadrature components.

13. The two way communication system of claim 11 wherein said out of band receiver PHY further comprises a forward error correction decoder that decodes said in phase and quadrature components and forwards serial or parallel data to said out of band receiver processor.

14. A method for reducing latency in a communications system comprising:

monitoring activity level of a first transceiver;

disabling a high power channel of said first transceiver as a function of said activity level;

activating a low power channel of said first transceiver to enable reception of control signals from a second transceiver;

the first transceiver generating a request for a sleep command as a function of said activity level of said first transceiver;

the second transceiver verifying a status of said first transceiver; and the second transceiver communicating an acknowledgement of said request to said first transceiver as a function of said status, wherein said high power channel of said first transceiver is disabled upon receipt of said acknowledgment.

15. The method of claim 14 further comprising the second transceiver activating a downstream traffic filter, the downstream traffic filter facilitating disregarding of low priority traffic to the first transceiver.

16. A method for mitigating latency in a communications system while the communications system is operating at reduced power comprising:

disabling a primary communication channel of a first transceiver;

disabling one or more connected peripheral devices while the primary communication channel is disabled; and receiving messages from a second transceiver, transmitted on a secondary communication channel, wherein said messages arc used to restore normal operating conditions when an unscheduled, high priority message arrives;

wherein a bandwidth of said secondary channel is less than a bandwidth of said primary communication channel, and wherein the step of communicating with the second transceiver via said secondary communication channel comprises the second transceiver transmitting an address of the first transceiver, and the first transceiver resuming operation of the primary communication channel upon receipt of said address via the secondary communication channel.

* * * * *